United States Patent
Hart

(10) Patent No.: US 11,827,216 B2
(45) Date of Patent: Nov. 28, 2023

(54) OPTIMAL SENSOR READING FOR LOW LATENCY OBJECT DETECTION

(71) Applicant: Deere & Company, Moline, IL (US)

(72) Inventor: Sean Hart, Freehold, NJ (US)

(73) Assignee: Deere & Company, Moline, IL (US)

( * ) Notice: Subject to any disclaimer, the term of this patent is extended or adjusted under 35 U.S.C. 154(b) by 218 days.

(21) Appl. No.: 17/115,600

(22) Filed: Dec. 8, 2020

(65) Prior Publication Data

US 2022/0176947 A1    Jun. 9, 2022

(51) Int. Cl.
  *B60W 30/09*   (2012.01)
  *G06T 7/593*   (2017.01)
  *B60W 30/095*  (2012.01)

(52) U.S. Cl.
  CPC ........ *B60W 30/09* (2013.01); *B60W 30/0956* (2013.01); *G06T 7/593* (2017.01); *B60W 2420/42* (2013.01); *B60W 2554/801* (2020.02); *G06T 2207/10016* (2013.01); *G06T 2207/30261* (2013.01)

(58) Field of Classification Search
  CPC .......... G06T 2207/30252; G06T 2207/30261; B60W 2554/801; H04N 2013/0081
  See application file for complete search history.

(56) References Cited

U.S. PATENT DOCUMENTS

| | | | |
|---|---|---|---|
| 9,357,228 B2 * | 5/2016 | Au | H04N 19/57 |
| 2017/0096144 A1 * | 4/2017 | Elie | B60W 40/068 |
| 2020/0082556 A1 * | 3/2020 | Sano | G06T 5/009 |
| 2022/0116519 A1 * | 4/2022 | Nikhara | G06F 1/1686 |

FOREIGN PATENT DOCUMENTS

WO    WO-2020139477 A1 *  7/2020  .......... B64C 39/024

OTHER PUBLICATIONS

Čížek, Petr, Jan Faigl, and Diar Masri. "Low-latency image processing for vision-based navigation systems." 2016 IEEE International Conference on Robotics and Automation (ICRA). IEEE, 2016. (Year: 2016).*

Wong, Justin SJ, et al. "Ultra-low latency continuous block-parallel stream windowing using FPGA on-chip memory." 2017 International Conference on Field Programmable Technology (ICFPT). IEEE, 2017. (Year: 2017).*

Ranft, Benjamin, and Christoph Stiller. "The role of machine vision for intelligent vehicles." IEEE Transactions on Intelligent vehicles 1.1 (2016): 8-19. (Year: 2016).*

* cited by examiner

*Primary Examiner* — Russell Frejd
*Assistant Examiner* — Ana D Thomas
(74) *Attorney, Agent, or Firm* — Straub & Straub; Michael P. Straub; Stephen T. Straub

(57) ABSTRACT

Methods and apparatus for matching portions of images are described as well as using depth information generated from the matching results. In various embodiments, lower portions of images of a scene area, which are more likely to include objects closer to a vehicle on which cameras are mounted, than are portions of images corresponding to an upper portion of the scene area, are processed and used for depth determination. In this way, depths to objects, which are likely to be closer to the vehicle than objects in the upper portion of the scene area, are determined first and used to control a vehicle reducing the risk of collision as compared to systems where the depth determination of an entire scene is completed before depth information is used for control purposes with the order of processing being such that nearer objects are likely to be detected prior to more distant objects.

18 Claims, 11 Drawing Sheets

OPTIMAL SENSOR READING FOR LOW LATENCY OBJECT DETECTION

FIELD

The present application relates to camera device methods and apparatus and, more particularly to methods and apparatus for matching portions of images captured by different cameras, e.g., as part of a stereo depth determination operation where the depth information can be used in controlling a device such as a vehicle.

BACKGROUND

Camera systems are often used to control one or more devices. As automated control of cars and other vehicles continues to grow in interest, the ability to capture visual information and use it to control a vehicle such as a car or another device is of ever growing interest.

Vehicle control often involves controlling the speed and/or position of a vehicle relative to one or more objects around the vehicle, e.g., to avoid impacts with pedestrians, cars and/or other objects. From a vehicle control perspective, it is often desirable to know the distance from the vehicle in which a camera or cameras are located and an object. A depth map is one way of representing the distance between device including one or more cameras and the objects in the field of view of the cameras.

For the problem of depth perception via multiple, e.g., stereo, cameras, a key step is the identification, given a pixel in a reference image, of the corresponding pixels in other images. Once corresponding pixels have been identified, the depth of the part of the object imaged by the reference pixel can be determined given known geometry of the cameras involved. Identifying correspondences, however, is challenging and can be time consuming.

Given that the processing of images captured by different cameras to detect depth, e.g., the distance to objects and a vehicle is moving, it should be appreciated that obtaining depth information as soon as possible, particularly with regard to objects near a vehicle is desirable so that collision avoidance steps can be taken if necessary.

In view of the above, it should be appreciated that there is a need for improved methods of generating depth information from multiple images which would allow depths corresponding to image portions which are likely to be closer to a vehicle to be determined as soon as possible, e.g., before depths corresponding to other portions of a scene area.

SUMMARY

Methods and apparatus for determining depths to objects in a scene area in a timely manner are described. The methods and apparatus are used in some embodiments to make depth determinations which are used to control a vehicle, e.g., to automatically apply brakes or change vehicle speed or change vehicle direction to avoid a collision.

An exemplary method of capturing and using images, in accordance with some embodiments, comprises: capturing images of a scene area using a set of camera devices; reading image data out of one or more of the camera devices beginning at a bottom of the captured scene area and progressing towards the top of the captured scene area; and performing depth processing on image data corresponding to a lower portion of scene area to determine distances to one or more objects prior to performing depth processing on image data corresponding to an upper scene area.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

DETAILED DESCRIPTION

In a scene, objects that are closer tend to be in the bottom of the scene. In a stereo or multiview camera application, the order in which the scene is read from the camera sensors can improve reaction time to nearest objects. Reading the sensor from the bottom of the scene to the top of the scene will detect the objects lower in the scene first. These objects are typically closer to the cameras; therefore, it will improve reaction time.

With global sensors, where the sensor captures all pixels of the image at the same time, the pixels read out of the sensor first should be the bottom of the scene. This will allow the stereo or multiview processing to work on the bottom of the scene first with the most recent image data thereby increasing the probability of detecting the closest objects first. This provides a shorter reaction time to objects that are closer.

With rolling shutter sensors, pixels in the sensor are captured at different times, the reaction time benefit is most significant when the sensor is read at a rate faster than the stereo or multi-view processing rate. As an example, the sensor is read, buffered partially or fully, and then processed. If the buffering is zero, then the latency from sensor capture to processing results is relatively constant across the image. However, as the buffering increases, the latency also increases, and therefore the first data into and out of the buffer should be the bottom of the scene. This will have a higher probability of detecting the closer objects first with the least latency by using the sensor data with the least delay.

The bottom of scene can be read first by electronic or mechanical means. If the sensor has an electronic option to be read from the bottom of the scene first, then that can be used. Otherwise, the sensor can be mechanically rotated such that the first line read is the bottom of the scene.

Figure 1:
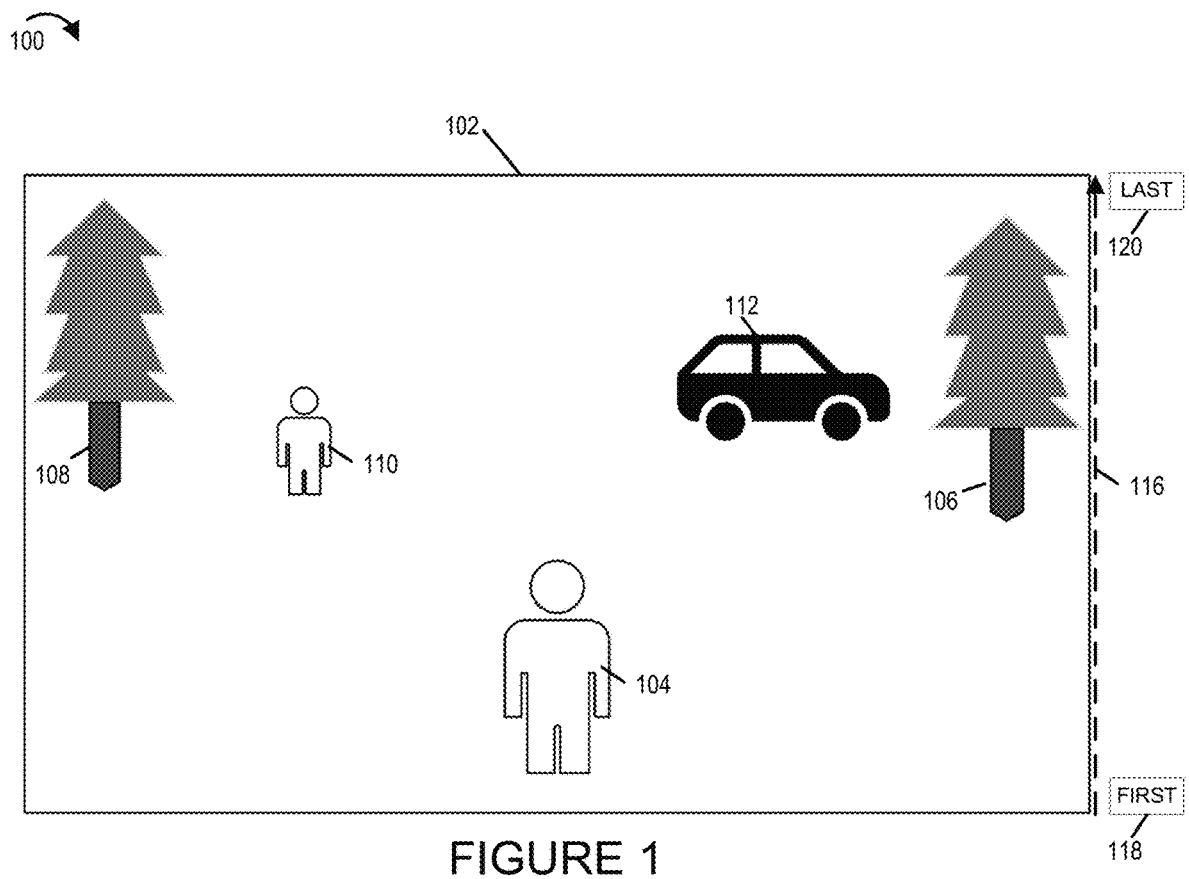
FIG. 1 is a drawing illustrating an exemplary captured scene and a scene read order in accordance with an exemplary embodiment.

FIG. 1 is a drawing 100 illustrating an exemplary scene 102, captured by a camera in a vehicle mounted camera array, and a scene read order with regard to processing, represented by arrow 116, in accordance with an exemplary embodiment. The scene 102 includes two people 104, 110, a car 112 and two trees 106, 108. Person 104, appearing in the bottom portion of the scene area is the closest object to the camera, capturing the image of the scene area, and is the first object that needs to be considered regarding collision avoidance. The cameras in the camera array used to capture images of the scene area may be and sometimes are oriented, or use lenses oriented, in a manner that objects closer to the camera array will appear in the bottom of the captured images with more remote objects appearing in the upper portion of the captured images. This can and sometimes does involve angling the lenses or optical axis of the cameras in the array used to capture images slightly downward.

In such a case, objects near the bottom, e.g., a lower portion, of a captured image are likely to be closer to the camera array and vehicle than objects shown in the upper, e.g., top, portion of an image of a scene.

The exemplary scene 102 may be, and sometimes is captured, by a reference camera in a vehicle mounted in a camera array implemented in accordance with the invention in a manner that objects closer to the camera array are more likely to be captured in a lower portion of a captured image than in an upper portion of the captured image. In the case of a camera array, one or more other cameras, which are in addition to the reference camera in the camera array, capture additional images of the scene from different locations allowing the images to be processed and depth information to be obtained from comparing the images. By determining differences in where objects appear in images captured by cameras corresponding to different locations and using information about the camera locations depths, e.g., distances from the reference camera in the camera array or another point, to objects shown in the exemplary scene 102 can and are computed in some embodiments.

Person 104 is the closest object, e.g., the object nearest the camera array and thus the vehicle on which the camera array is mounted and is shown in the bottom of the scene. The next closest object to the bottom of the scene is tree 106. The next closet object to the bottom of the scene is person 110. The next closet object to the bottom of the scene is tree 108. The next closet object to the bottom of the scene is car 112. The scene read order for reading the sensor which captures the scene area is represented by dashed line arrow 116. The first line 118 read of the sensor is from the bottom of the scene. The last line 120 read from the sensor is from the top of the scene 102.

Figure 2:
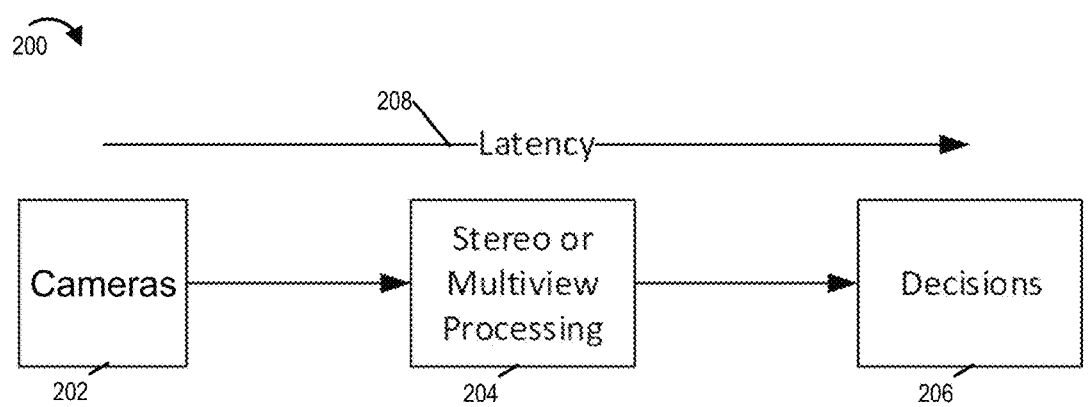
FIG. 2 is a drawing which illustrates exemplary cameras, each of which captures an image of a scene area, exemplary stereo or multiview processing of captured images and exemplary decisions based on the processing.

FIG. 2 is a drawing 200 which illustrates exemplary image processing and the associated latency along with the use of the processing result, e.g., a depth map of the environment, to make decisions. As shown in FIG. 2 cameras 202, each of which captures an image of a scene area from a different location in a camera array, provide captured images to exemplary stereo or multiview processing 204, which generates a depth map based on the multiple different images of the captured scene area. The depth information included in the depth map is supplied to step 206 in which decisions 206 relating to vehicle control are made based on the generated depth information. For example in step 206 decisions to perform one or more of a braking, steering, or speed control operation as part of collision avoidance are made and then used to control the vehicle on which the cameras 202 are mounted. Arrow 208 indicates that there is latency involved between the image capture and decisions.

In various embodiments the depth map or maps generated by image processing take the form of a set of values with each value corresponding to a pixel of a captured image showing the scene area to which the depth map corresponds and thus objects in the scene area. The depth map may be and sometimes is based on an image captured by one of the cameras in the camera array, e.g., a camera used as a reference camera, with each value, e.g., pixel value in a depth map represented as an image, indicating the distance from the reference camera to an object included in the scene area. Any one of the cameras in a camera array can be used as the reference camera. Thus, to the extent that different pixels in the depth map correspond to different objects or portions of objects they can indicate different distances. Since the reference camera is part of the array mounted on a vehicle, the depth map provides an indication of distances between the vehicle on which the camera array is mounted and the objects in the environment that are shown in the images captured by the cameras in the camera array. This depth information can and sometimes is used to control the vehicle.

In various embodiments, as will be discussed below one or more depth maps are generated from a set of images, e.g., in real time. The generation of depth maps maybe and sometimes is performed several times a second, e.g., 10 times or more a second, but in some embodiments the depth map generation may take one or more seconds. The depth information, after generation, is then used to control vehicle operation and potentially avoid an impact with an object by steering or braking the vehicle before impact.

Even with depth maps being generated in less then a second, in the case of a moving vehicle the risk of impacting a object as the vehicle moves even for a fraction of a second is very real. Accordingly, it is desirable to maximize the amount of time available for taking action to avoid an impact.

As will be discussed below, in various embodiments, depth information for one or more lower portions of a captured scene area can be, and sometimes are, generated and used in accordance with the invention for control purposes before depth information for the upper portion of a scene area is generated. Such lower portions of the scene area, when the ground or area above the ground is included in the lower portion of the captured scene area, are likely to include the objects closest to the camera system in many cases. This is because most objects in the real world are on or in contact with the ground. Objects on the ground closer to the vehicle which is also on the ground, and thus capture system, are likely to obstruct more distant objects on the ground. Objects in the upper portion of a scene area are often more distant because they either correspond to tall objects in the distance which are unobstructed or because they are visible due to a change in elevation which is normally a function of distance, e.g., a road change in elevation which occurs over some amount of distance or at a distance from the vehicle on which the image capture system is mounted.

The processing of image portions corresponding to the lower scene area before upper image portions, e.g., to determine the distance to one or more objects in the captured scene image, allows decisions to be made with regard to objects which are likely to be close to the vehicle without having to wait for depth information to be generated for the entire scene area. Thus, decisions and control operations can be made before one or more upper scene portions are fully processed and the depth information for such portions are generated.

The advantage of obtaining information about distance to objects which are more likely to be closer to the vehicle before objects further away allows for efficient use of the limited time available before a possible collusion with a nearby object to be used for vehicle control without having to wait for a determination of distance to objects which are likely to be further away and for which there is likely to be more time to perform collision avoidance.

Thus, depth map information for different portions of a scene area are generated and used separately with in some embodiments one or more lower portions of a captured scene area being processed and depth information being generated for such portions before depth information is generated for one or more upper scene portions.

While explained in the exemplary context of a lower and upper scene portion, in some embodiments a captured image of a scene area is treated as having multiple lower scene portions and upper scene portions, e.g., with each scene portion corresponding to a set of adjacent rows of pixel values corresponding to pixel elements of one or more sensors. In some embodiments in which a scene area includes multiple lower scene area portions they are processed from the bottom of the scene progressing to the top of the scene. The order processing of the upper scene portions is the same with scene portions corresponding to lower portions of the upper scene area being processed before higher portions of the upper scene area with a top most scene area portion being processed in some embodiments last. In such embodiments a set of useful depth information is generated for each scene area as processing of the scene area portion is completed. The results, e.g., individual depth maps for individual scene area portions, are combined in some embodiments to generate a complete depth map of the scene area included in a captured set of images.

The invention can be used with cameras with global shutters where the entire scene area is captured by a sensor which has its pixel elements exposed at the same time. In such a case the pixels of the captured image correspond to the same exposure time period.

Figure 3:
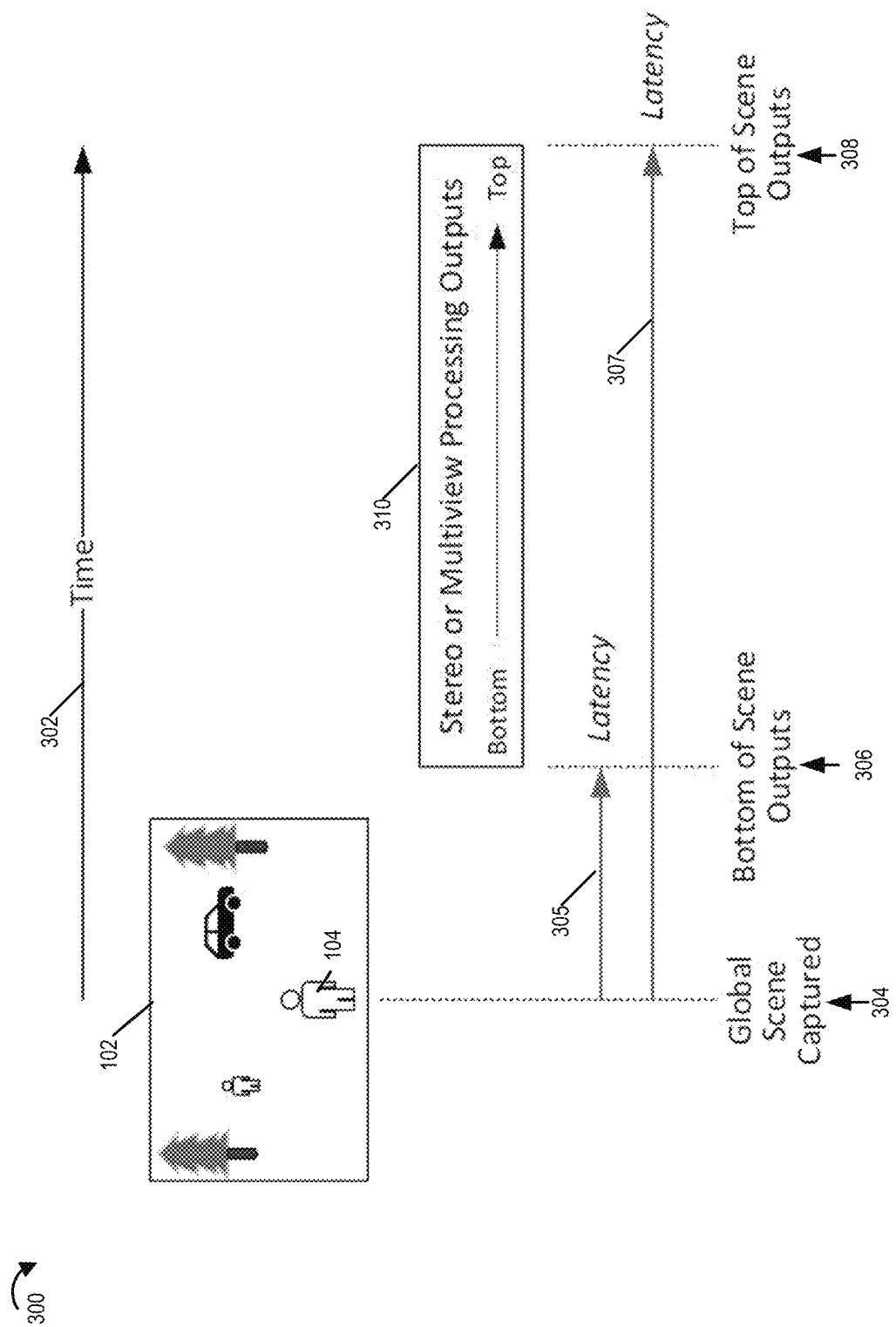
FIG. 3 is a drawing illustrating an example in which a camera uses a global shutter sensor, and the reaction time is reduced by using an approach of processing the bottom of the scene first, e.g. the processing identifies an object which is closet to the camera and which is in the bottom area of the captured image before the processing of the entire scene area image is complete.

The method can also be used with cameras that have rolling shutters. In the case of rolling shutters a global shutter, e.g., an electronic or physical global shutter, not used and pixel values are read out of a sensor sequentially, e.g., with the pixel values corresponding to different rows corresponding to different time periods. While different rows of pixel values may correspond to different capture time periods, the exposure time used to generate the pixel values of each row is normally the same. FIG. 3 is a drawing 300 illustrating an example in which cameras which use global shutter sensors are used in the camera array. In the FIG. 3 example the reaction time is reduced by using an approach of processing the bottom of the scene first, e.g. the processing identifies an object, e.g., person 104, which is closet to the camera and which is in the bottom area of the captured image, before the processing of the entire scene area image is complete. Drawing 300 includes captured scene area image 102 including person 104 (closest object to the camera), a time axis 302, a global scene area capture time 304, a first latency time 305 from the capture time 304 to the time 306 of bottom of scene area processing outputs, and a second latency time 307 from the capture time 304 to the time 308 of top of scene area outputs. Block 310 represents the time range for stereo or multiview processing outputs. Reaction time corresponds to the amount of time between capture of an image and the time a control decision and/or vehicle control operation is made based on the content of the captured image. The vehicle control operation may be and sometimes is a braking, steering, suspension and/or speed control operation.

Global Shutter Latency (305, 307) shown in FIG. 3 is shown as part of an example used to illustrate reduced reaction time, in accordance with the exemplary approach, when using a global shutter sensor. First the entire image 102 is captured as the same time, as represented by global scene area capture time 304. This is the result of using a global shutter in the cameras of the camera array which captures the images of the scene area in parallel, e.g., at the same time to facilitate depth map generation. The global shutter in some embodiments as an electronic global shutter but in other embodiments as a physical shutter. In the case of some embodiments of an electronic global shutter the camera resets all pixels, exposes them all at the same time to light, and at the end of exposure transfers the value of all pixels to a storage cell per pixel at the same time. Those storage cells then read out row by row, staring with the bottom portion of the scene first in accordance with some embodiments of the invention.

In the case of a rolling shutter the camera sensor exposes a row or multiple rows of pixel sensor elements at a time, and then reads that data, i.e., the pixel values. Exposure of the next row or rows of pixel elements begins following the exposure start time of a preceding row or rows, and the data for the row or rows is then read out. This process repeats until the end of an image and capture/processing of a new image occurs. Exposures of different rows can overlap in time in the case of a rolling shutter.

Then the images 102 are processed from the bottom of the scene to the top of the scene, as indicated by block 310. Thus, bottom portions of multiple images 102 are processed to generate depth information corresponding to the bottom portion of a captured scene before depths are generated for the top portion of the captured scene area. The outputs of the image processing are produced related to the order of the input. By reading the images from the bottom first, the output will also start from the bottom. This provides results for the bottom of image first at time 306, with results for the top of the image, e.g., scene area, being output last at time 308. Since objects in the bottom of the scene are typically closer, the results for those objects (such as person 104) will be produced first. These results are fed into decision logic. Having the results for those objects (bottom of image objects which are typically closer to the cameras) sooner will decrease the reaction time as compared to waiting for the image of the entire scene area to be fully processed or as compared to processing the top portion first. Therefore, with this method of reading, decisions with regard to objects that are closer are likely to have a shorter reaction time than objects further away. Since the distance to closer objects is less than the distance to more remote objects, the time to take corrective action to avoid collision with such objects is less than for the remote objects. Thus, the image processing order and decision making process that avoids waiting for the images to be fully processed can reduce the risk of a collision or object impact as compared to other approaches.

Figure 4:
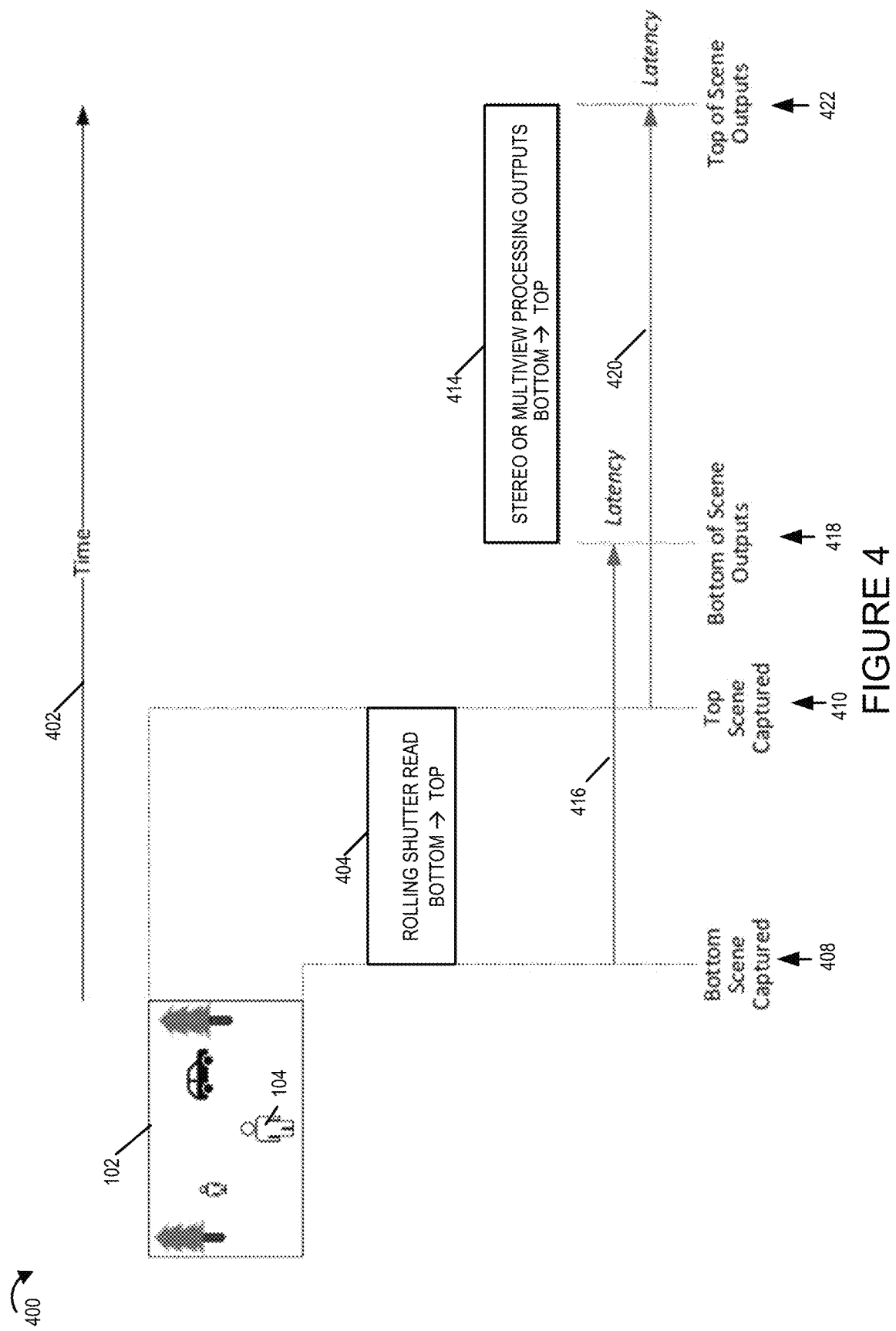
FIG. 4 is a drawing illustrating an example in which a camera uses a rolling shutter sensor, and the reaction time is reduced by using an approach of processing the bottom of the scene first, e.g. the processing identifies an object which is closet to the camera and which is in the bottom area of the captured image before the processing of the entire scene area image is complete.

FIG. 4 is a drawing 400 illustrating an example in which cameras that use rolling shutter sensors are used to capture and provide pixel values for depth processing. As in the FIG. 3 example, the reaction time is reduced as compared to other approaches by using an approach of processing the bottom of the scene first, e.g. the processing identifies an object, e.g., person 104, which is closet to the camera and which is in the bottom area of the captured image before the processing of the entire scene area image is complete. Drawing 400 includes captured scene area image 102 including person 104 (closest object to the camera), a time axis 402, a rolling shutter (which reads from bottom to top) read time interval 404, a bottom scene area capture time 408, a top scene area capture time 410, a first latency time 416 from the bottom scene area capture time 408 to the time 418 of bottom of scene area processing outputs, and a second latency time 420 from the top scene area capture time 410 to the time 422 of top of scene area outputs.

Rolling Shutter Latency (416, 420), shown in FIG. 4, is an example used to illustrate reduced reaction time, in accordance with the exemplary approach, when using a rolling shutter sensor. With a rolling shutter sensor, the image 102 is captured and read out in lines over time during rolling shutter read time interval 404. The bottom of the scene is integrated and read out first, working towards the top of the scene. The image 102 is processed from the bottom of the scene to the top of the scene. The outputs, e.g., depth information, produced by the image processing are generated in an order related to the order of the input to the processing step. By reading the image from the bottom first, the output depth information will also start from the bottom. This approach provides results for the bottom of image first at time 418, with results for the top of the image being output last at time 422. Since objects in the bottom of the scene 102 such as person 104, are typically closer, the results for those objects will be produced first. These results are fed into decision logic used to control vehicle operation. Having the depth information sooner for the bottom of the image will decrease the reaction time with respect to near objects as compared to if the top of the image corresponding to more distant objects were produced first or the entire captured images were processed before depth information used for control decisions. Therefore, with this method of reading, objects that are closer to the vehicles and thus camera array are more likely to have a shorter reaction time than more distant objects.

Figure 5:
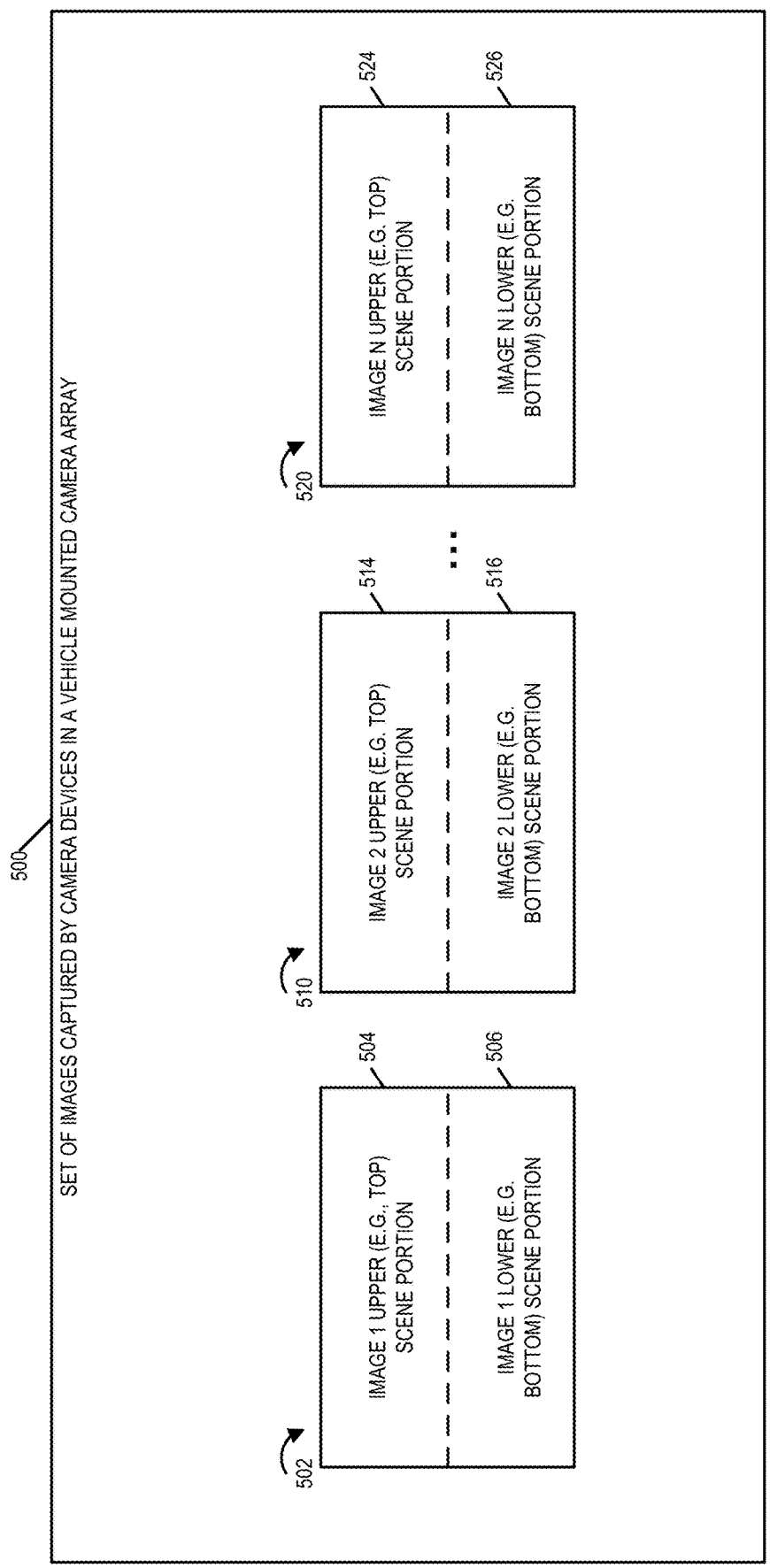
FIG. 5 shows a set of images captured by camera devices in a vehicle mounted camera array including N cameras, where is an integer greater than 2, and where each image includes a lower image portion and an upper image portion, said lower image portions are processed, e.g. for depth map generation and object determinations, before said upper image portions are processed, in accordance with a feature of various exemplary embodiments.

FIG. 5 shows a set of images 500 captured by camera devices in a vehicle mounted camera array including N cameras where is an integer greater than 2. Set of images 500 includes image 1 502, image 2 510, . . . , image N 520. Each image (image 1 502, image 2 510, . . . , image N 520) includes an upper (e.g., top) image portion (image 1 upper (e.g. top) scene portion 502, image 2 upper (e.g., top) scene portion 514, . . . , image N upper (e.g., top) scene portion 524), and a lower (e.g. bottom) scene portion (image 1 lower (e.g., bottom) scene portion 506, image 2 lower (e.g., bottom) scene portion 516, . . . , image N lower (e.g., bottom) scene portion 526), respectively.

While more than two images are shown in FIG. 5 it should be appreciated that more than two images are not required for all embodiments and in some embodiment an array of just two cameras are used to capture, e.g., in parallel, a pair of images corresponding to an area of an environment in which a vehicle on which the cameras are mounted. The spacing and orientation of the cameras in the array is known since the cameras are mounted in a fixed spatial relationship with respect to one another and lens orientation. This facilitates depth determination operations from the captured images.

Figure 6:
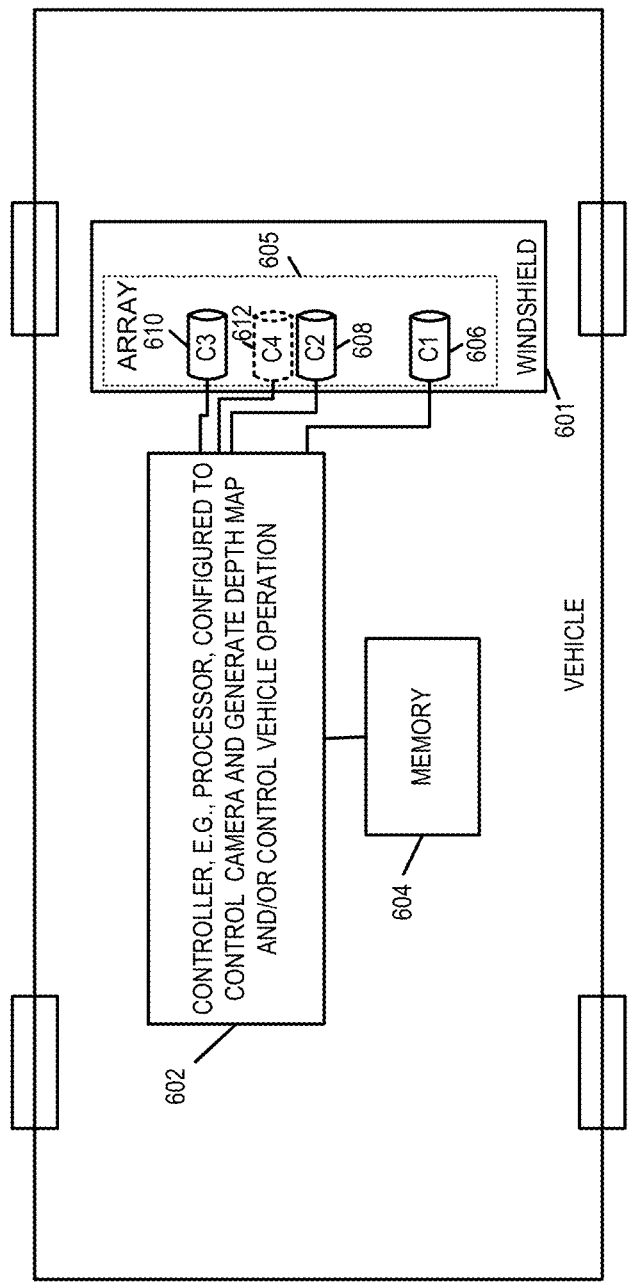
FIG. 6 is a drawing of an exemplary vehicle which supports image capture using multiple cameras, image processing in accordance with the invention to identify matching portions of images and to produce depth information, and performs vehicle control vehicle operations based on the depth information obtained from the image processing.

FIG. 6 is a drawing of an exemplary vehicle 600 which supports image capture using multiple cameras, image processing in accordance with the invention to identify matching portions of images and to produce depth information, and vehicle control vehicle based on the depth information obtained from the image processing. Exemplary vehicle 600 includes a plurality of cameras, camera 1 (C1) 606, camera 2 (C2) 608, camera 3 (C3) 610, and camera 4 (C4) 612, which capture images through a windshield 601. In one exemplary embodiment cameras C1 606, C2 608 and C3 610 are along a horizontal axis, and cameras C2 608 and C4 612 are along a vertical axis. Exemplary vehicle 600 further includes a windshield 601, a controller 602, e.g., a processor, configured to control camera operation including camera synchronization, identify matching portions of images to produce depth information, generate a depth map, and/or control vehicle operation, memory 604. The first camera C1 606 is mounted inside the vehicle and faces outward to capture images as viewed through the windshield 601; the second camera C2 608 is mounted inside the vehicle and faces outward to capture images as viewed through the windshield 601; the third camera C3 610 mounted inside the vehicle and faces outward to capture images as viewed through the windshield 601; and the fourth camera C4 612 is mounted inside the vehicle and faces outward to capture images as viewed through the windshield 601. In some embodiments, the set of cameras (camera C1 606, camera C2 608, camera C3 610, camera C4 612) are part of an array 605 of cameras mounted on the front, a side, or rear of vehicle 600, and the cameras capture a scene area in an environment in which vehicle 600 is located or moving through. In some embodiments, the camera devices (camera C1 606, camera C2 608, camera C3 610, camera C4 612) are angled or shaped such that in the case of level ground, the lower (e.g., bottom) portion of the scene area will include ground closer to the camera devices than the upper (e.g.,) top portion of the scene area.

Controller 602 is coupled to each of the cameras (C1 606, C2 608, C3 610, C4 612). Controller 602 controls the cameras to initiate image capture, e.g., in synchronization.

Controller 602 receives images captured by each of the cameras (C1, C2, C3, C4). Controller 602 identifies matching portions of images, e.g., captured from different cameras at the same time. Controller 502 uses matching portions of images to produce depth information and generate a depth map. In some embodiments, controller 602 decides which of the captured images to use in generating a depth map and/or how to weight content from a captured image in generating a depth map. In some embodiments, controller 602 controls a vehicle control operation, e.g. one of a direction, braking, or speed control operation, to be performed in response to a generated depth map. In various embodiments, controller 602 uses the depth map information to perform collision avoidance operations and/or perform autopilot operations.

Figure 7:
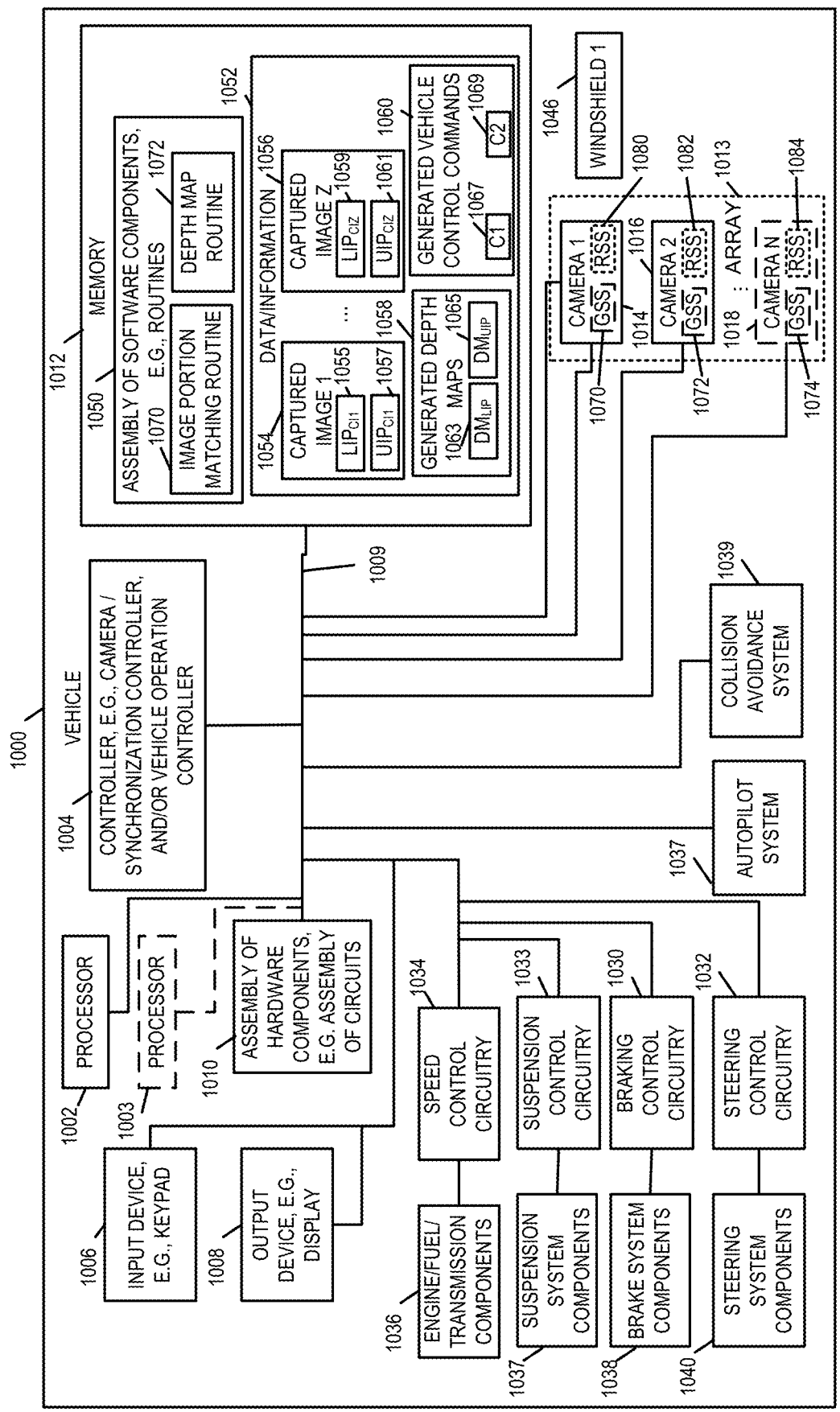
FIG. 7 is a drawing of an exemplary vehicle which supports image capture using multiple cameras, image processing in accordance with the invention to identify matching portions of images and to produce depth information and vehicle control based on the depth information obtained from the image processing.

FIG. 7 is a drawing of an exemplary vehicle 1000 which supports image capture using multiple cameras, image processing in accordance with the invention to identify matching portions of images and to produce depth information and vehicle control vehicle based on the depth information obtained from the image processing. Exemplary vehicle 1000 includes a processor 1002, e.g., a CPU, a controller 1004, e.g., a camera/synchronization controller and/or vehicle operation controller 1004, an input device 1006, e.g., a keypad, an output device 1008, e.g., a display, an assembly of hardware components 1010, e.g., an assembly of circuits, memory 1012, a plurality of cameras (camera 1 1014, camera 2 1016, . . . , camera N 1018), speed control circuitry 1034, braking control circuitry 1030, suspension control circuitry 1033, steering control circuitry 1032, an autopilot system 1037, and a collision avoidance system 1039 coupled together via a bus 1009 over which the various components may interchange data and information. In some embodiments, the autopilot system 1037 and/or the collision avoidance system 1039 are coupled together and/or to the speed control circuitry 1034, braking control circuitry 1030 and/or steering control circuitry. Vehicle 1000 further includes a windshield 1 1046, e.g., a front window, through which the cameras capture images. Vehicle 1000 further includes engine/fuel/transmission components 1036, e.g., a motor, internal combustion and/or electric, computer controlled fuel injection system, electronically controlled transmission, etc., which is coupled to speed control circuitry 1034. Vehicle 1000 further includes brake system components 1038, e.g., ABS system, brake sensors, wheel motion sensors, wheel position sensors, actuators, hydraulic components, electronically controlled brakes, etc, coupled to braking control circuitry 1030. Vehicle 1000 further includes suspension system components 1037, e.g., gas shocks or hydraulic lifters or other suspension components which can be used to adjust vehicle height, tilt and/or resistance to rocking or other motion due to sudden changes in wheel height due to such things as pot holes or bumps in the road. Vehicle 1000 further includes steering system components 1040, e.g., rack and pinion unit, steering input controls and steering drive components including motors, etc., coupled to steering control circuitry 1032. In some embodiments, the steering control circuitry 1034, suspension control circuitry 1033, braking control circuitry 1030 and/or steering control circuitry 1032 is part of an autonomous or semi-autonomous driving control system and/or an assisted driving control system. In some embodiments, vehicle 1000 further includes an additional optional processor 1003 coupled to bus 1009. Braking, suspension, speed and/or steering can be and sometimes are adjusted under control of the collision avoidance system 1039 to avoid an impact with an object detected based on images captured by the camera array which are processed to provide object depth information.

In some embodiments, controller 1004 is not included in vehicle 1000 and the functionality of controller 1004 is incorporated in processor 1002.

In some embodiments, the set of cameras (camera 1 1014, camera 2 1016, . . . , camera N 1018) are part of an array 1013 of cameras mounted on the front, side or rear of vehicle 1000, and the cameras capture a scene area in an environment in which vehicle 1000 is located or moving through. In some embodiments, the camera devices (camera 1 1014, camera 2 1016, . . . , camera N 1018) are angled or shaped such that in the case of level ground, the lower (e.g., bottom) portion of the scene area will include ground closer to the camera devices than the upper (e.g.,) top portion of the scene area.

In some embodiments each of the camera devices (camera 1 1014, camera 2 1016, . . . , camera N 1018) includes a global shutter sensor (GSS) (1070, 1072, . . . , 1074), respectively. In some embodiments each of the camera devices (camera 1 1014, camera 2 1016, . . . , camera N 1018) includes a rolling shutter sensor (RSS) (1080, 1082, . . . , 1084), respectively.

Memory 1012 includes an assembly of software components 1050, e.g., an assembly of software routines or software modules, and data/information 1052. Assembly of software components 1050 includes an image portion matching routine 1070 and a depth map routine 1072. Data/information 1052 includes captured images (captured image 1 1054, . . . , captured image Z 1056), a generated depth maps 1058, e.g., generated from captured image portions, and generated vehicle control commands 1060, e.g., to be sent to speed control circuitry 1034, braking control circuitry 1030, steering control circuitry, autopilot system 1037 and/or collision avoidance system 1039, e.g. in response to a detected change and/or problem, detected by analyzing the generated depth map, e.g., a stopped or disabled truck suddenly is detected in front of the vehicle resulting in a control command for avoidance.

Captured image 1 data/information 1054 includes a lower image portion LIPCI1 1055 and an upper image portion UIPCI1 1057. Similarly, captured image Z data/information 1056 includes a lower image portion LIPCIZ 1059 and an upper image portion UIPCIZ 1061. Generated depth maps 1058 includes a depth map based on captured lower image portions of a scene area from a plurality of cameras, DMLIP 1063, and a depth map based on captured upper image portions of a scene area from a plurality of cameras, DMUIP 1065. Generated vehicle control commands 1060 include a first vehicle control command C1 1067, which was generated in response to a detected object in a lower image portion of a scene area, and a second vehicle control command C2 1069 which was generated in response to a detected object in an upper image portion of a scene area.

Figure 8A:
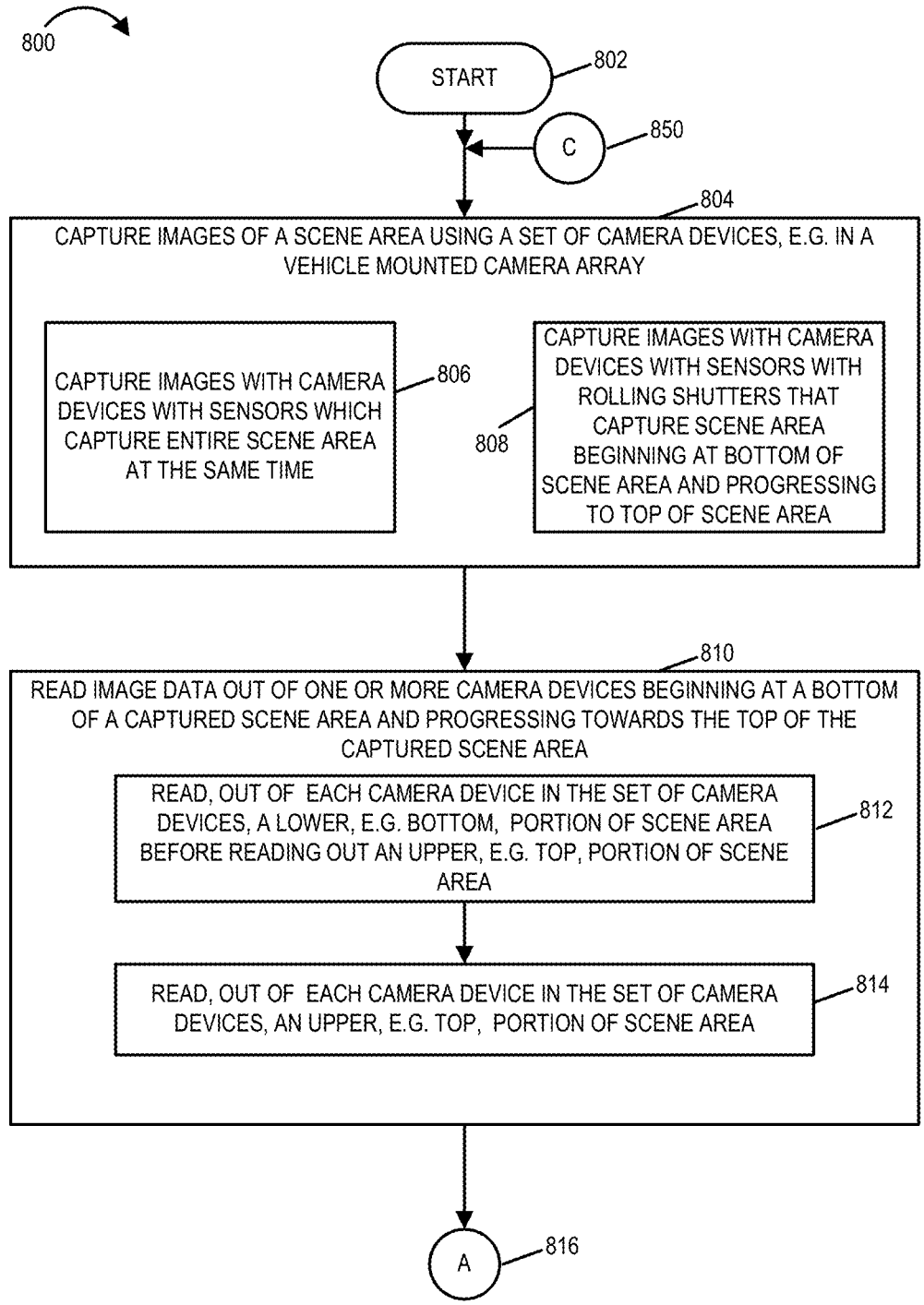
FIG. 8A is a first part of a flowchart of an exemplary method of capturing and using images in accordance with an exemplary embodiment.
Figure 8B:
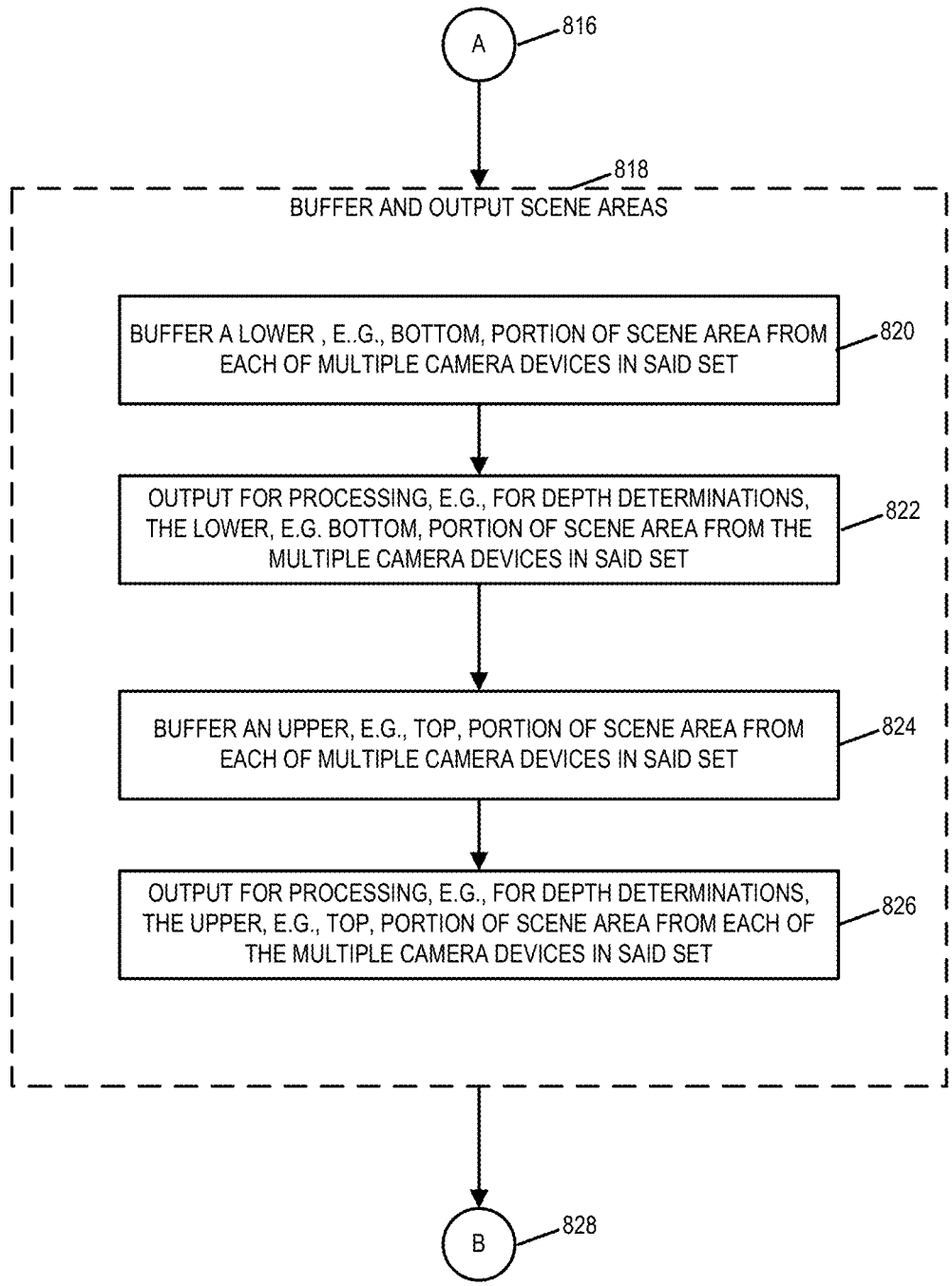
FIG. 8B is a second part of a flowchart of an exemplary method of capturing and using images in accordance with an exemplary embodiment.
Figures 8, 8A, 8B, 8C:
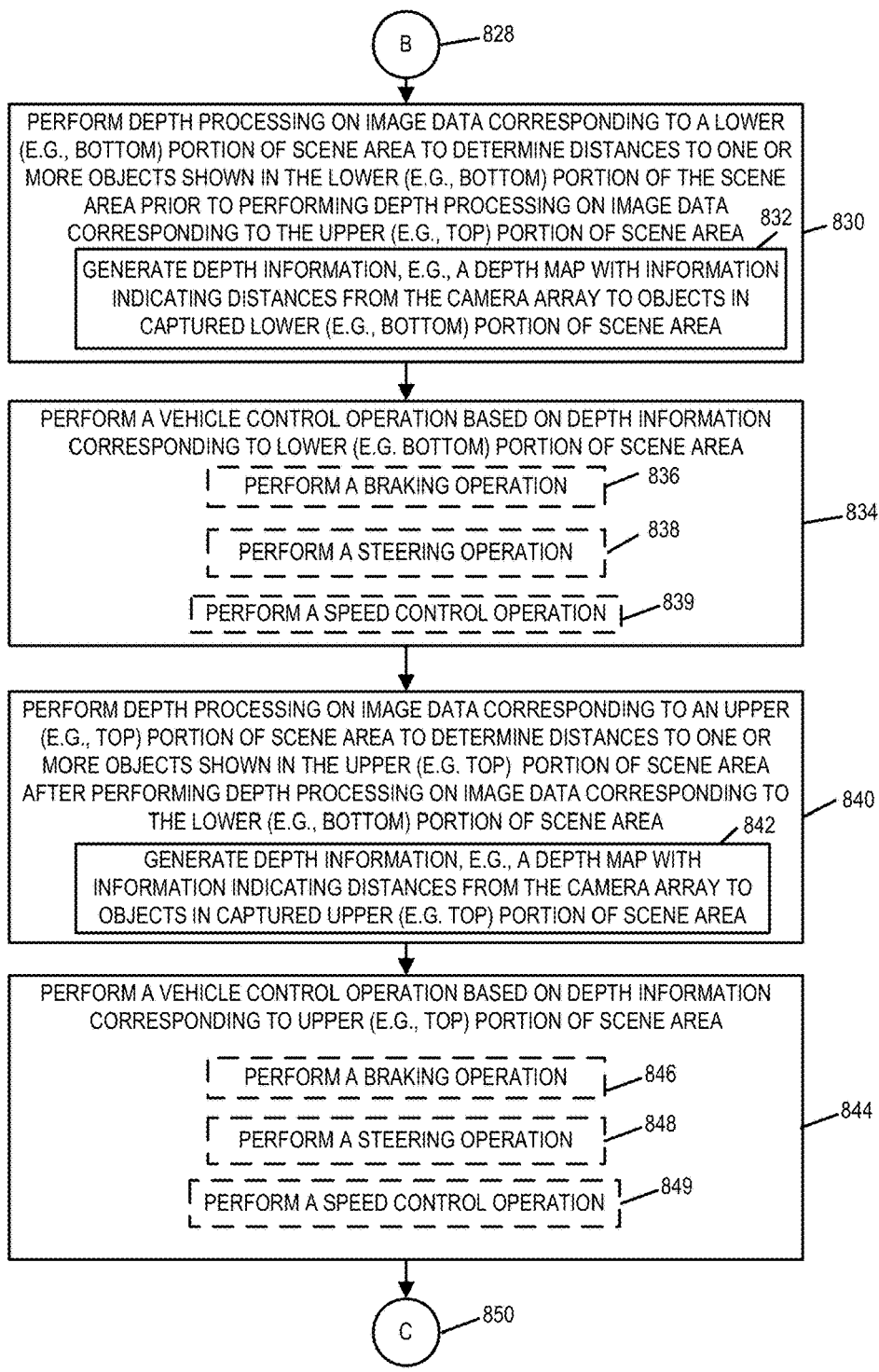
FIG. 8C is a third part of a flowchart of an exemplary method of capturing and using images in accordance with an exemplary embodiment.
FIG. 8 comprises the combination of FIG. 8A, FIG. 8B and FIG. 8C.

Vehicle 1000 is, e.g., vehicle 600 of FIG. 6 a vehicle implementing the method of flowchart 800 of FIG. 8, and/or a vehicle implementing novel methods and/or apparatus described in this application and/or shown in any of the Figures. Vehicle 1000 is, e.g., any of: a land vehicle, e.g., a car, truck, motorcycle, bicycle, train, unmanned terrestrial vehicle, etc., a sea or water vehicle, e.g., boat, ship, unmanned water vehicle, etc., amphibious vehicle, air vehicle, e.g., airplane, helicopter, glider, unmanned aerial vehicle, etc.

Various exemplary numbered embodiments are discussed below. The numbered embodiments are exemplary and the application is not limited to such embodiments.

FIG. 8, comprising the combination of FIG. 8A, FIG. 8B and FIG. 8C, is a flowchart 800 of an exemplary method of capturing and using images, e.g., for supporting vehicle control operations such as collision avoidance, driving assistance and/or autonomous vehicle control, in accordance with an exemplary embodiment. Operation starts in step 802 in which an image capture, processing and control system, e.g., a vehicle (600 or 1000) or a set of devices/components included in a vehicle (600 or 1000). is powered on and initialized. Operation starts from start step 802 to step 804.

In step 804 a set of camera devices, e.g., in a vehicle mounted camera array, are operated to capture images of a scene area (e.g., images 502, 510, . . . 520). In some embodiments, step 804 includes step 806 in which camera devices with sensors which capture an entire scene area at the same time, e.g., global shutter sensors, are operated to capture images. In some embodiments, step 804 includes step 808 in which camera devices, with sensors with rolling shutters that capture a scene area beginning at the bottom of a scene area and progressing to the top of a scene area, are operated to capture images of a scene area.

Operation proceeds from step 804 to step 810. In some embodiments, in which the cameras include global shutter sensors operation proceeds from step 804 to step 810 after the image capture is complete. In some embodiments, in which the cameras include sensors with rolling shutters operation proceeds from step 804 to step 810 while step 804 is still in progress. In step 810 the system reads image data out of the camera devices beginning at the bottom of a captured scene area and progressing towards the top of the captured scene area. Step 810 includes step 812 and step 814. In step 812 the system reads, out of each camera device in the set of camera devices, a lower, e.g., bottom, portion of scene area (e.g., image 1 lower scene portion 506, image 2 lower scene portion 516, . . . , image N lower scene portion 526) before reading out an upper, e.g., top, portion of scene area. Operation proceeds from step 812 to step 814. In step 814 the system reads, out of each camera device in the set of camera devices, an upper, e.g., top, portion of scene area (e.g., image 1 upper scene portion 504, image 2 upper scene portion 514, . . . , image N upper scene portion 524).

In some embodiments, operation proceeds from step 810, via connecting node A 816, to optional step 818. In other embodiments, operation proceeds from step 810 to step 830.

Returning to step 818, in step 818 the system buffers and outputs scene areas. Step 818 includes steps 820, 822, 824 and 826. In step 820 the system buffers a lower, e.g., bottom, scene area from each of multiple camera devices in the set. Operation proceeds from step 820 to step 822. In step 822 the system outputs for processing, e.g., for depth determinations, the lower, e.g., bottom, portion of scene area from the multiple camera devices in said set. Operation proceeds from step 822 to step 824. In step 824 the system buffers an upper, e.g., top, scene area from each of multiple camera devices in said set. Operation proceeds from step 824 to step 826. In step 826 the system outputs for processing, e.g., for depth determinations, the upper, e.g., top scene area from the multiple camera devices in said set. Operation proceeds from step 818, via connecting node B 828 to step 830.

In step 830 the system performs depth processing on image data corresponding to a lower, e.g., bottom, portion of scene area to determine distances to one or more objects, e.g., person 104, shown in the lower, e.g., bottom, portion of the scene area prior to performing depth processing on image data corresponding to the upper, e.g., top, portion of scene area. Step 830 includes step 832. In step 832 the system generates depth information, e.g., a depth map with information indicating distances from camera array to objects in captured lower, e.g., bottom, portion of scene area. Operation proceeds from step 830 to step 834.

In step 834, the system performs a vehicle control operation based on depth information corresponding to the lower, e.g., bottom, portion of scene area. In some embodiments, step 834 includes one or more or all of steps 836, 838 and 839. In step 836 the system performs a braking operation, e.g., controlling the vehicle to stop before reaching an object in its path. In step 838, the system performs a steering operation, e.g., controlling the vehicle to turn, e.g. change lanes, to avoid and object in its path. In step 839 the system performs a speed control operation, e.g. controlling the vehicle to decelerate or accelerate to avoid a collision with an object. Operation proceeds from step 834 to step 840.

In step 840 the system performs depth processing on image data corresponding to an upper, e.g., top, portion of scene area to determine distances to one or more objects shown in the upper, e.g., top, portion of scene area after performing depth processing on image data corresponding to the lower, e.g., bottom, portion of scene area. Step 840 includes step 842, in which the system generates depth information, e.g., a depth map with information indicating distances from the camera array to objects in captured upper, e.g., top, portion of scene area. Operation proceeds from step 840 to step 844. In step 844, the system performs a vehicle control operation based on depth information corresponding to the upper, e.g. top, portion of scene area. In some embodiments, step 844 includes one or more or all of steps 846, 848 and 849. In step 846 the system performs a braking operation. In step 848, the system performs a steering operation. In step 849 the system performs a speed control operation 849. Operation proceeds from step 844, via connecting node C 850 to step 804.

Numbered List of Exemplary Method Embodiments

Method Embodiment 1. A method of capturing and using images, the method comprising: capturing images (804) of a scene area using a set of camera devices (e.g., cameras in an array mounted on a vehicle such as on the front, a side or rear of the vehicle so that images of the environment in which the vehicle is located or moving through are captured); reading (810) image data out of one or more of the camera devices beginning at a bottom of the captured scene area and progressing towards the top of the captured scene area; and performing depth processing (830) on image data corresponding to a lower (e.g., bottom) portion of scene area to determine distances to one or more objects prior to performing depth processing on image data corresponding to an upper (e.g., top) portion of scene area.

Method Embodiment 2. The method of Method Embodiment 1, further comprising: performing (834) a first vehicle control operation based on at least one of said determined distances.

Method Embodiment 3. The method of Method Embodiment 2, wherein cameras in said set of camera devices are part of a camera array mounted on the front, as side, or rear of a vehicle; and wherein said scene area is an environment in which the vehicle is located or moving.

Method Embodiment 4. The method of Method Embodiment 3, wherein said camera devices are angled or shaped such that in the case of level ground the lower (e.g., bottom) portion of the scene area will include ground closer to said camera devices than the upper (e.g., top) portion of said scene area.

Method Embodiment 5. The method of Method Embodiment 1 further comprising: performing (834) a first vehicle control operation based on at least one of the determined distances corresponding to the lower (e.g., bottom) portion of the scene area (e.g., prior to performing a vehicle control operation based on depth information, e.g., distances, corresponding to an upper (e.g., top) portion of the scene area).

Method Embodiment 6. The method of Method Embodiment 5, wherein said first vehicle control operation includes at least one of a braking, steering, or speed control operation.

Method Embodiment 7. The method of Method Embodiment 5, further comprising: performing depth processing (840) on image data corresponding to an upper (e.g., top) portion of the scene area to determine distances to one or more objects shown in the upper (e.g., top) portion of said scene area after performing (830) said depth processing on image data corresponding to the lower (e.g., bottom) portion of said scene area; and performing (844) a second vehicle control operation based on at least one of said determined distances to one or more objects shown in the upper (e.g., top) portion of said scene area, said second vehicle control operation being performed after said first vehicle control operation.

Method Embodiment 8. The method of Method Embodiment 2, wherein capturing images (804) of the scene area using the set of camera devices includes capturing (808) images using multiple camera devices in parallel (e.g., at the same time), said multiple camera devices including sensors with rolling shutters that capture (808) the scene area beginning at the bottom of the scene area and progressing towards the top of the scene area.

Method Embodiment 9. The method of Method Embodiment 5, further comprising: buffering (820) data from multiple camera devices corresponding to the lower (e.g., bottom) portion of scene area; outputting (822) to one or more processors, which perform said depth processing, buffered data from the multiple camera devices corresponding to the lower (e.g., bottom) portion of scene area, prior to outputting (826) buffered data from the multiple camera devices corresponding to the upper (e.g., top) portion of scene area (e.g., image data is buffered, lower (e.g., bottom) scene area data from the multiple cameras is supplied to one or more processors for depth determinations prior to, in some embodiments, any of the scene data corresponding to the upper (e.g., top) portion of the scene area being supplied to the one or more processors for depth processing. In one such embodiment the full images are not supplied sequentially to the one or more processors for depth processing but instead the image data corresponding to the lower scene area is first supplied so that it can be processed and depth determinations made corresponding to the lower (e.g., bottom) portion of scene area followed by the supplying of image data corresponding to the upper (e.g., top) portion of scene area).

Figure 9A:
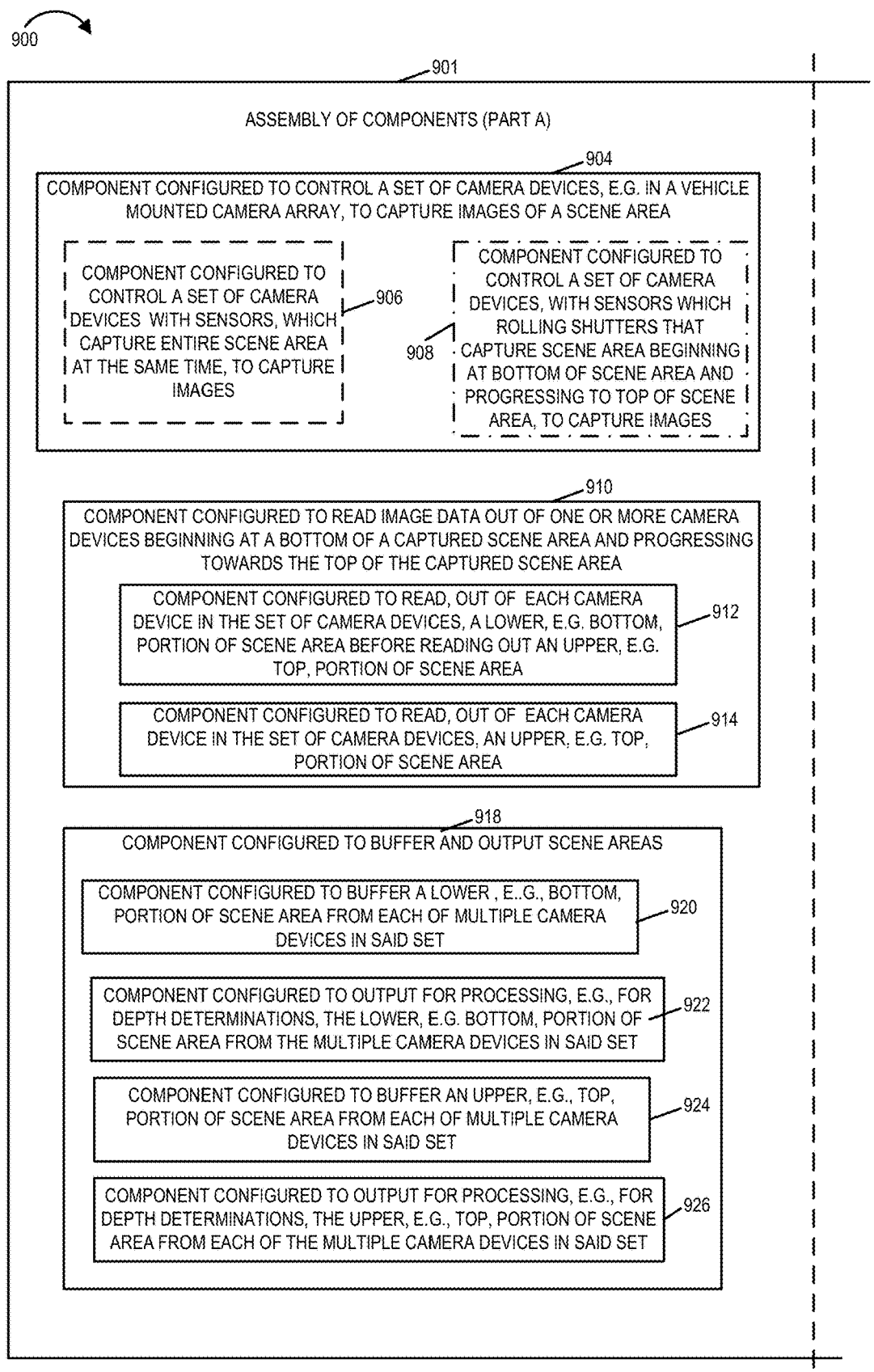
FIG. 9A is a first part of an exemplary assembly of components, which may be included in a system implemented in accordance with an exemplary embodiment.
Figures 9, 9B:
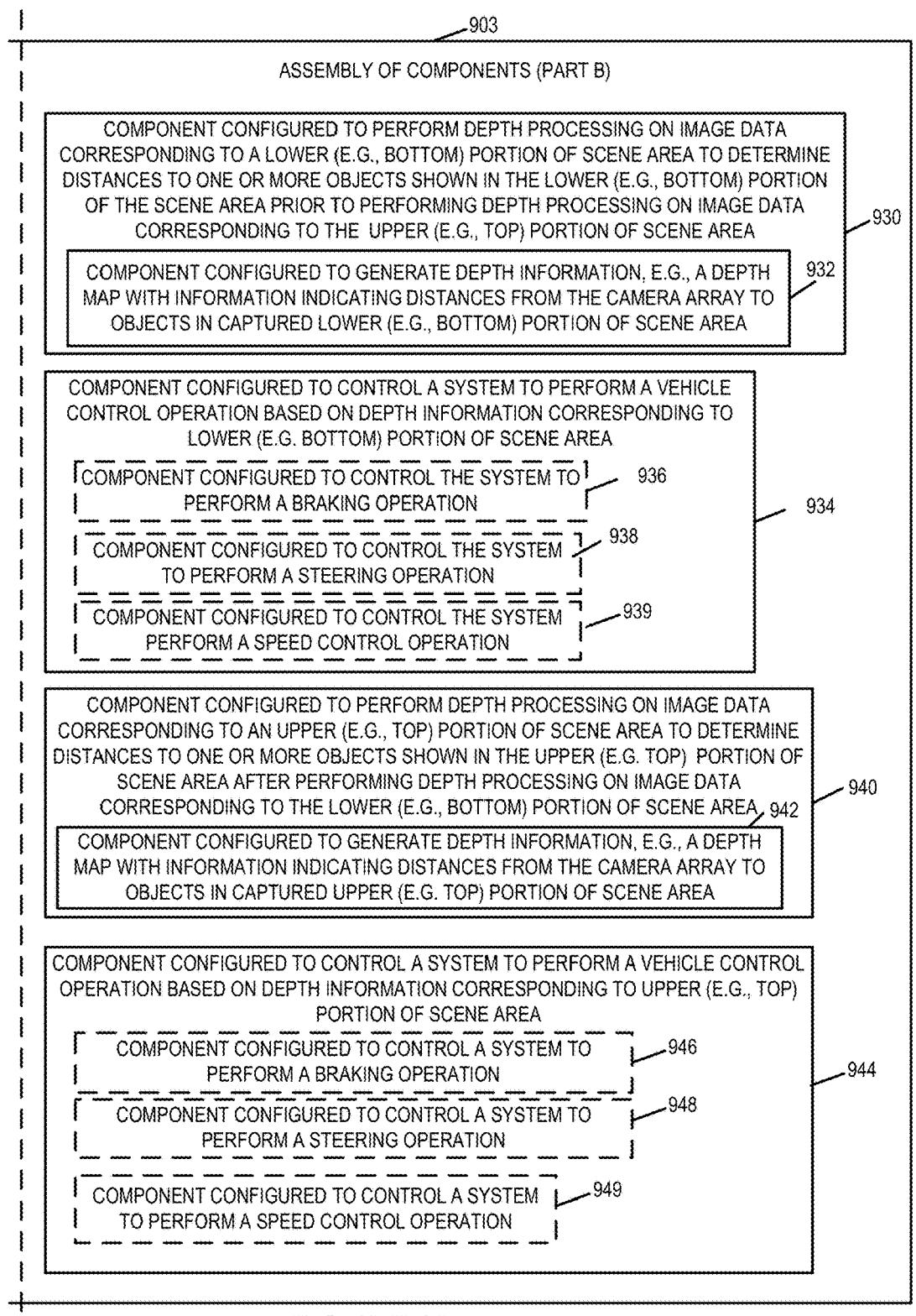
FIG. 9B is a first part of an assembly of components, which may be included in a system implemented in accordance with an exemplary embodiment.
FIG. 9 comprises the combination of FIG. 9A and FIG. 9B.

FIG. 9, comprising the combination of FIG. 9A and FIG. 9B, is a drawing of an exemplary assembly of components 900, comprising Part A 901 and Part B 903, which may be included in a system, e.g. vehicle 600 or vehicle 1000, or a system included as part of vehicle 600 or vehicle 1000, in accordance with an exemplary embodiment. Exemplary assembly of components 900 may be included in a vehicle such as the exemplary vehicle 600 of FIG. 6 and/or exemplary vehicle 1000 of FIG. 7 and/or a system or vehicle, which implement steps of an exemplary method, e.g., steps of the method of the flowchart 800 of FIG. 8.

Assembly of components 900 can be, and in some embodiments is, used in vehicle 600 of FIG. 6, and/or vehicle 1000 of FIG. 7. The components in the assembly of components 900 can, and in some embodiments are, implemented fully in hardware within the processor 1002, e.g., as individual circuits. The components in the assembly of components 900 can, and in some embodiments are, implemented fully in hardware within the assembly of components 1010, e.g., as individual circuits corresponding to the different components. In other embodiments some of the components are implemented, e.g., as circuits, within the processor 1002 with other components being implemented, e.g., as circuits within assembly of components 1010, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1010 of the vehicle 1000, with the components controlling operation of the vehicle to implement the functions corresponding to the components when the components are executed by a processor, e.g., processor 1002. In some such embodiments, the assembly of components 900 is included in the memory 1012 as assembly of components 1050 or as part of assembly of components 1050. In still other embodiments, various components in assembly of components 900 are implemented as a combination of hardware and software, e.g., with another circuit external to the processor 1002 providing input to the processor 1002 which then under software control operates to perform a portion of a component's function. While processor 1002 is shown in the FIG. 10 embodiment as a single processor, e.g., computer, it should be appreciated that the processor 1002 may be implemented as one or more processors, e.g., computers.

When implemented in software the components include code, which when executed by the processor 1002, configure the processor 1002 to implement the function corresponding to the component. In embodiments where the assembly of components 900 is stored in the memory 1012, the memory 1012 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the vehicle 1000, or elements therein such as the processor 1002, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method, e.g., steps of: the method of flowchart 800 of FIG. 8, and/or described or shown with respect to any of the other figures.

Assembly of components 900 includes a component 904 configured to control a set of camera devices, e.g., in a vehicle mounted camera array, to capture images of a scene area. In some embodiments, component 904 includes a component 906 configured to control a set of camera devices with sensors (e.g., global shutter sensors), which capture an entire scene area at the same time, to capture images. In some embodiments, component 904 includes a component 908 to control a set of camera devices with sensors which rolling shutters that capture scene area beginning at a bottom on a scene area and progressing to a top of the scene area, to capture images.

Assembly of components 900 further includes a component 910 configured to read out image data out of one or more camera devices beginning at a bottom of a captured scene area and progressing towards the top of the captured scene area. Component 910 includes a component 912 configured to read out of each camera device in the set of camera devices a lower, e.g. bottom, portion of a scene area before reading out an upper, e.g. top, portion of the scene area, and a component 914 configured to read out of each camera device in the set of camera devices, e.g. an upper, e.g. top, portion of the scene area.

Assembly of components 900 further includes a component 918 configured to buffer and output scene areas. Component 918 includes a component 920 configured to buffer a lower, e.g., bottom, portion of a scene area from each of multiple camera devices in said set, and a component 922 configured to output for processing, e.g., for depth determinations, the lower, e.g. bottom, portion of scene area, for each of multiple camera devices in said set. Component 918 further includes a component 924 configured to buffer an upper, e.g., top, portion of a scene area from each of multiple camera devices in said set, and a component 926 configured to output for processing, e.g., for depth determinations, the upper, e.g. top, portion of scene area, for each of multiple camera devices in said set.

Assembly of components 900 further includes a component 930 configured to perform depth processing on image data corresponding to a lower, e.g. bottom, portion of scene area to determine distances to one or more objects shown in the lower, e.g. bottom portion of the scene areas prior to performing depth processing on image data corresponding to the upper, e.g. top, portion of scene area. Component 930 includes a component 932 configured to generate depth information, e.g. a depth map with information indicating distances from the camera array to objects in the captured lower, e.g. bottom, portion of the scene area. Assembly of components 900 further includes a component 934 configured to control a system to perform a vehicle control operation based on depth information corresponding to a lower, e.g. bottom portion of a scene area. Component 934 includes a component 936 configured to control the system to perform a braking operation, e.g. in response to a detected object in the lower portion of the scene area to stop or slow the vehicle to avoid collision with the detected object, a component 938 configured to control the system to perform a steering operation, e.g. in response to a detected object in the lower portion of the scene area to avoid collision with the detected object, and a component 939 configured to control the system to perform a speed control operation, e.g. in response to a detected object in the lower portion of the scene area to avoid collision with the detected object.

Assembly of components 900 further includes a component 940 configured to perform depth processing on image data corresponding to an upper, e.g. top, portion of scene area to determine distances to one or more objects shown in the upper, e.g. top portion of the scene areas after performing depth processing on image data corresponding to the lower, e.g. bottom, portion of the scene area. Component 940 includes a component 942 configured to generate depth information, e.g. a depth map with information indicating distances from the camera array to objects in the captured upper, e.g. top, portion of the scene area. Assembly of components 900 further includes a component 944 configured to control a system to perform a vehicle control operation based on depth information corresponding to an upper, e.g. top, portion of a scene area. Component 944 includes a component 946 configured to control the system to perform a braking operation, e.g. in response to a detected object in the upper portion of the scene area to stop or slow the vehicle to avoid collision with the detected object, a component 948 configured to control the system to perform a steering operation, e.g. in response to a detected object in the upper portion of the scene area to avoid collision with the detected object, and a component 949 configured to control the system to perform a speed control operation, e.g. in response to a detected object in the upper portion of the scene area to avoid collision with the detected object.

Numbered List of Exemplary System Embodiments

System Embodiment 1. A system (1000 or 600) for capturing and using images, the system comprising: a set (1013 or 605) of camera devices (1014, 1016, 1018 or 606, 608, 610, 612) (e.g., cameras in an array mounted on a vehicle such as on the front, a side, or rear of the vehicle so that images of the environment in which the vehicle is located or moving through are captured); and a processor (1002 or 602) configured to: operate (804) the set of camera devices to capture images of a scene area; read (810) image data out of one or more of the camera devices beginning at a bottom of the captured scene area and progressing towards the top of the captured scene area; and perform (830) depth processing on image data corresponding to a lower (e.g., bottom) portion of scene area to determine distances to one or more objects prior to performing depth processing on image data corresponding to an upper (e.g., top) portion of scene area.

System Embodiment 2. The system (1000 or 600) of System Embodiment 1, wherein said processor (1002 or 602) is further configured to: control the system (1000 or 600) to perform (834) a first vehicle control operation based on at least one of said determined distances.

System Embodiment 3. The system (1000 or 600) of System Embodiment 2, wherein cameras ((606, 608, 610, 612) or (1014, 1016, 1018) in said set of camera devices (605 or 1013) are part of a camera array (605 or 1013) mounted on the front, a side, or rear of a vehicle; and wherein said scene area is an environment in which the vehicle is located or moving.

System Embodiment 4 The system (1000 or 600) of System Embodiment 3, wherein said camera devices ((606, 608, 610, 612) or (1014, 1016, 1018)) are angled or shaped such that in the case of level ground the lower (e.g., bottom) portion of the scene area will include ground closer to said camera devices than the upper (e.g., top) portion of said scene area.

System Embodiment 5 The system (1000 or 600) of System Embodiment 1 wherein processor (1002 or 602) is further configured to: control the system to perform (834) a first vehicle control operation based on at least one of the determined distances corresponding to the lower (e.g., bottom) portion of the scene area (e.g., prior to performing a vehicle control operation based on depth information, e.g., distances, corresponding to an upper (e.g., top) portion of the scene area).

System Embodiment 6. The system (1000 or 600) of System Embodiment 5, wherein said first vehicle control operation includes at least one of a braking, steering, or speed control operation.

System Embodiment 6A. The system (1000 or 600) of System Embodiment 6, further comprising: braking control circuitry (1030) which receives control signals from said processor (1002 or 602).

System Embodiment 6B. The system (1000 or 600) of System Embodiment 6, further comprising: steering control circuitry (1032) which receives control signals from said processor (1002 or 602).

System Embodiment 6C. The system (1000 or 600) of System Embodiment 6, further comprising: speed control circuitry (1034) which receives control signals from said processor (1002 or 602).

System Embodiment 7. The system (1000 or 600) of System Embodiment 5, wherein said processor (1002 or 602) is further configured to: perform depth processing (840) on image data corresponding to an upper (e.g., top) portion of the scene area to determine distances to one or more objects shown in the upper (e.g., top) portion of said scene area after performing (830) said depth processing on image data corresponding to the lower (e.g., bottom) portion of said scene area; and control the system to perform (844) a second vehicle control operation based on at least one of said determined distances to one or more objects shown in the upper (e.g., top) portion of said scene area, said second vehicle control operation being performed after said first vehicle control operation.

System Embodiment 8. The system (1000 or 600) of System Embodiment 2, wherein said multiple camera devices (1014, 1016, 1018) including sensors with rolling shutters (1070, 1072, 1074) that capture (808) the scene area beginning at the bottom of the scene area and progressing towards the top of the scene area, and wherein said processor (1002 or 602) is configured to control the system to capture (808) images from multiple camera devices in parallel (e.g., at the same time), as part of being configured to operate (804) the set of camera devices to capture images of a scene area.

System Embodiment 9. The system (1000 or 600) of System Embodiment 5, further comprising: memory (1012 or 604); and wherein said processor (1002 or 602) is further configured to: buffer (820) data from multiple camera devices corresponding to the lower (e.g., bottom) portion of scene area into said memory (1012 or 604); outputting (822) from said memory (1012 or 604) to one or more processors (602 or (1002 and/or 1003)) which perform said depth processing, buffered data from the multiple camera devices corresponding to the lower (e.g., bottom) portion of scene area, prior to outputting (826) buffered data from the multiple camera devices corresponding to the upper (e.g., top) portion of scene area (e.g., image data is buffered, lower (e.g., bottom) scene area data from the multiple cameras is supplied to one or more processors for depth determinations prior to, in some embodiments, any of the scene data corresponding to the upper (e.g., top) portion of the scene area being supplied to the one or more processors for depth processing. In one such embodiment the full images are not supplied sequentially to the one or more processors for depth processing but instead the image data corresponding to the lower scene area is first supplied so that it can be processed and depth determinations made corresponding to the lower (e.g., bottom) portion of scene area followed by the supplying of image data corresponding to the upper (e.g., top) portion of scene area).

System Embodiment 9A. The system of System Embodiment 1, wherein said system is a vehicle (e.g., a manned or unmanned vehicle).

List of Exemplary Computer Readable Medium Embodiments

Numbered Computer Readable Medium Embodiment 1. A non-transitory computer readable medium (1012 or 604) including computer executable instructions which when executed by a processor (1002 or 602) control a system (1000 or 600) to perform the steps of: capturing images (804) of a scene area using a set (1013 or 605) of camera devices ((1014, 1016, 1018) or (606, 608, 610, 612)) (e.g., cameras in an array mounted on a vehicle such as on the front, a side, or rear of the vehicle so that images of the environment in which the vehicle is located or moving through are captured); reading (810) image data out of one or more of the camera devices beginning at a bottom of the captured scene area and progressing towards the top of the captured scene area; and performing depth processing (830) on image data corresponding to a lower (e.g., bottom) portion of scene area to determine distances to one or more objects prior to performing depth processing on image data corresponding to an upper (e.g., top) portion of scene area.

The order of steps is in various flow diagrams is intended to be exemplary and not limiting and to the extent that the steps can be performed in another order such other orders are contemplated and within the scope of this disclosure.

Numerous additional variations on the methods and apparatus of the present invention described above will be apparent to those skilled in the art in view of the above description of the invention. For example, while described in the context of a vehicle mounted system the methods and apparatus for using wipers in combination with multiple captures which are used to generate depth maps can be used for stationary applications as well where an area is monitored and depth information is used for security or control applications. In such cases as in the vehicle mounted embodiment giving greater weight and influence to images captured more recently to the point in time a wiper sweeps and cleans an area in front of a camera can improve reliability as compared to systems which do not take into consideration when a wiper sweeps in front of the surface, e.g., surface of a glass or lens, in front of the camera or cameras capturing the images used in generating environmental depth, e.g., distance, information.

The order in which steps are performed is exemplary and it should be appreciated that images can be captured at different times, e.g., sequentially by different cameras and/or at the same time, e.g., with multiple cameras being controlled to capture images at the same time. In many cases where depth map or depth information is to be generated, the images which are compared, e.g., reference image captured by a reference and images captured by other cameras in the system, the images which are captured to one another are captured at the same time, e.g., in parallel. In this way the images correspond to the vehicle location at the time the set of image are captured.

Numerous additional variations and combinations are possible while remaining within the scope of the invention.

In at least some embodiments one or more vehicle control operations are implemented based on a distance determined from a lower portion of a processed scene area before processing of an upper portion of the same scene is completed. Thus in some cases a braking operation (e.g., application of brakes), steering operation (e.g., turning to avoid an object), suspension operation (e.g., vehicle height adjustment made to avoid, e.g., allow the vehicle to pass over by raising the vehicle) or speed control operation (e.g., slowing the vehicle to reduce the risk of impact with another moving vehicle) is performed based on depth, e.g., distance to object information, obtained from processing images of a lower portion of a scene area before processing of the images of the entire scene is completed, e.g., before depth information is obtained from processing one or more upper scene areas of the captured images.

The techniques of the present invention may be implemented using software, hardware and/or a combination of software and hardware. The present invention is directed to apparatus, e.g., mobile nodes such as mobile terminals, base stations, communications system which implement the present invention. It is also directed to methods, e.g., method of controlling and/or operating mobile nodes, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits to as modules alone or in combination with other hardware elements. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform one or more of the steps of the above-described method(s).

While described in the context of an apparatus, e.g., vehicle including cameras, at least some of the methods and apparatus of the present invention, are applicable to a wide range of image captures systems and devices including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed or sent to a printer for printing as a photo or permanent document which can be maintained in a file as part of a vehicle, personal or business record. Such records can be and sometimes are useful in documenting vehicle operation.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Various variations are to be considered within the scope of the invention. In various embodiments the camera are implemented as digital cameras as part of a system that includes one or more wipers, receiver/transmitter circuits and logic and/or routines, for implementing the methods of the present invention and/or for transiting captured images or generated composite images or depth maps to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain, e.g., chain being fixed with, in at least some embodiments the covering being a windshield of a vehicle.

Numerous additional embodiments are possible while staying within the scope of the above discussed features.

What is claimed is:

1. A method of capturing and using images, the method comprising:
    capturing images of a scene area using a set of camera devices, the set of camera devices including camera devices;
    reading image data out of one or more of the camera devices beginning at a bottom of a captured scene area and progressing towards the top of the captured scene area;
    performing depth processing on image data corresponding to a lower portion of scene area, the depth processing determining distances to one or more objects prior to performing depth processing on image data corresponding to an upper portion of scene area; and
    performing a first vehicle control operation based on at least one of the determined distances.

2. The method of claim 1,
    wherein cameras in the set of camera devices are part of a camera array mounted on the front, side, or rear of a vehicle; and
    wherein the scene area is an environment in which the vehicle is located or moving.

3. The method of claim 2, wherein the camera devices are angled or shaped such that in the case of level ground the lower portion of the scene area will include ground closer to the camera devices than the upper portion of the scene area.

4. The method of claim 1,
    wherein performing the first vehicle control operation is based on at least one of the determined distances corresponding to the lower portion of the scene area.

5. The method of claim 4, wherein the first vehicle control operation includes at least one of a braking, steering, or speed control operation.

6. The method of claim 4, further comprising:
performing depth processing on image data corresponding to an upper portion of the scene area to determine distances to one or more objects shown in the upper portion of the scene area after performing the depth processing on image data corresponding to the lower portion of the scene area; and
performing a second vehicle control operation based on at least one of the determined distances to one or more objects shown in the upper portion of said scene area, the second vehicle control operation being performed after the first vehicle control operation.

7. The method of claim 4, further comprising:
buffering data from multiple camera devices corresponding to the lower portion of scene area; and
outputting to one or more processors, which perform the depth processing, buffered data from the multiple camera devices corresponding to the lower portion of scene area, prior to outputting buffered data from the multiple camera devices corresponding to the upper portion of scene area.

8. The method of claim 1, wherein capturing images of the scene area using the set of camera devices includes capturing images using multiple camera devices in parallel, the multiple camera devices including sensors with rolling shutters that capture the scene area beginning at the bottom of the scene area and progressing towards the top of the scene area.

9. A system for capturing and using images, the system comprising:
a set of camera devices, the set of camera devices including camera devices; and
a processor configured to:
operate the set of camera devices to capture images of a scene area;
read image data out of one or more of the camera devices beginning at a bottom of a captured scene area and progressing towards the top of the captured scene area;
perform depth processing on image data corresponding to a lower portion of scene area to determine distances to one or more objects prior to performing depth processing on image data corresponding to an upper portion of scene area; and
control the system to perform a first vehicle control operation based on at least one of the determined distances.

10. The system of claim 9,
wherein cameras in the set of camera devices are part of a camera array mounted on the front, side or rear of a vehicle; and
wherein the scene area is an environment in which the vehicle is located or moving.

11. The system of claim 10, wherein the camera devices are angled or shaped such that in the case of level ground the lower portion of the scene area will include ground closer to the camera devices than the upper portion of the scene area.

12. The system of claim 9, wherein the processor is further configured to:
control the system to perform the first vehicle control operation based on at least one of the determined distances corresponding to the lower portion of the scene area, as part of being configured to control the system to perform the first vehicle control operation.

13. The system of claim 12, wherein the first vehicle control operation includes at least one of a braking, steering, or speed control operation.

14. The system of claim 12, wherein the first vehicle control operation includes a vehicle suspension control operation.

15. The system of claim 12, wherein the processor is further configured to:
perform depth processing on image data corresponding to an upper portion of the scene area to determine distances to one or more objects shown in the upper portion of the scene area after performing the depth processing on image data corresponding to the lower portion of the scene area; and
control the system to perform a second vehicle control operation based on at least one of the determined distances to one or more objects shown in the upper portion of the scene area, the second vehicle control operation being performed after the first vehicle control operation.

16. The system of claim 12, further comprising:
memory; and
wherein the processor is further configured to:
buffer data from multiple camera devices corresponding to the lower portion of scene area into the memory; and
output from the memory to one or more processors which perform the depth processing, buffered data from the multiple camera devices corresponding to the lower portion of scene area, prior to outputting buffered data from the multiple camera devices corresponding to the upper portion of scene area.

17. The system of claim 9, wherein the multiple camera devices including sensors with rolling shutters that capture the scene area beginning at the bottom of the scene area and progressing towards the top of the scene area, and
wherein the processor is configured to control the system to capture images from multiple camera devices in parallel, as part of being configured to operate the set of camera devices to capture images of a scene area.

18. A non-transitory computer readable medium including computer executable instructions which when executed by a processor control a system to perform the steps of:
capturing images of a scene area using a set of camera devices the set of camera devices including camera devices;
reading image data out of one or more of the camera devices beginning at a bottom of a captured scene area and progressing towards the top of the captured scene area,
performing depth processing on image data corresponding to a lower portion of scene area to determine distances to one or more objects prior to performing depth processing on image data corresponding to an upper portion of scene area; and
performing a first vehicle control operation based on at least one of the determined distances.

* * * * *